US010817137B2

(12) United States Patent
Labranche et al.

(10) Patent No.: US 10,817,137 B2
(45) Date of Patent: Oct. 27, 2020

(54) METHOD AND SYSTEM FOR COMMUNICATION BETWEEN WEB BROWSERS, USING A UNIFIED COMMUNICATION ENVIRONMENT

(71) Applicant: Orange, Paris (FR)

(72) Inventors: Miguel Labranche, Bonneuil sur Marne (FR); Xavier De Snoeck, Paris (FR)

(73) Assignee: ORANGE, Paris (FR)

( * ) Notice: Subject to any disclaimer, the term of this patent is extended or adjusted under 35 U.S.C. 154(b) by 515 days.

(21) Appl. No.: 15/107,797

(22) PCT Filed: Dec. 17, 2014

(86) PCT No.: PCT/FR2014/053395
§ 371 (c)(1),
(2) Date: Jun. 23, 2016

(87) PCT Pub. No.: WO2015/097367
PCT Pub. Date: Jul. 2, 2015

(65) Prior Publication Data
US 2016/0320927 A1    Nov. 3, 2016

(30) Foreign Application Priority Data

Dec. 23, 2013    (FR) ..................................... 13 63491

(51) Int. Cl.
*G06F 3/048* (2013.01)
*H04L 12/58* (2006.01)
(Continued)

(52) U.S. Cl.
CPC .......... *G06F 3/0482* (2013.01); *G06F 3/0486* (2013.01); *G06F 3/04817* (2013.01);
(Continued)

(58) Field of Classification Search
CPC . G06F 17/2247; G06F 3/04817; G06F 3/0482
See application file for complete search history.

(56) References Cited

U.S. PATENT DOCUMENTS 9,686,284 B2 *  6/2017  Shah ................... H04L 63/0884
10,362,173 B2 *  7/2019  Boehme .............. H04L 12/1831
(Continued)

OTHER PUBLICATIONS

Fette et al., "The WebSocket Protocol", Internet Engineering Task Force, RFC 6455, Dec. 2011.
(Continued)

*Primary Examiner* — Scott T Baderman
*Assistant Examiner* — Mario M Velez-Lopez
(74) *Attorney, Agent, or Firm* — David D. Brush; Westman, Champlin & Koehler, P.A.

(57) ABSTRACT

A method of RTC web type communication on a communication network, including connection of a user terminal to an environment server, providing a unified communication environment, and loading into a web browser of the user terminal a web application incorporated in a web page provided by the environment server. The method includes: dispatching a services activation request message, by the web application of the web browser destined for an application server, so as to determine the communication services which are currently authorized for the user; receiving by the browser a services activation response message, which contains data for access to a set of communication services, and activating by the web application in the user terminal, the services of the set of services; and updating a communication environment graphical interface, displayed in the user terminal by the web application executed by the browser, with the set of communication services.

15 Claims, 7 Drawing Sheets

(51) Int. Cl.
*G06F 3/0482* (2013.01)
*G06F 40/14* (2020.01)
*G06F 3/0481* (2013.01)
*G06F 3/0486* (2013.01)
*H04L 29/06* (2006.01)
*H04L 29/08* (2006.01)

(52) U.S. Cl.
CPC .............. *G06F 40/14* (2020.01); *H04L 51/36* (2013.01); *H04L 65/1069* (2013.01); *H04L 65/608* (2013.01); *H04L 67/02* (2013.01); *H04L 67/18* (2013.01); *H04L 67/42* (2013.01); *H04L 51/04* (2013.01)

(56) References Cited

U.S. PATENT DOCUMENTS

| | | | | |
|---|---|---|---|---|
| 10,430,552 B2* | 10/2019 | Mihai | ................ | G06F 19/3418 |
| 2001/0028654 A1* | 10/2001 | Anjum | ................ | H04Q 3/0045 370/401 |
| 2005/0108650 A1* | 5/2005 | Muehlhausen | ..... | H04L 63/0823 715/760 |
| 2009/0147772 A1* | 6/2009 | Rao | ........................ | H04L 67/22 370/352 |
| 2010/0099390 A1* | 4/2010 | Vendrow | ............. | H04M 3/4234 455/414.1 |
| 2014/0128108 A1* | 5/2014 | Siegel | ................... | H04M 3/567 455/458 |
| 2014/0368601 A1* | 12/2014 | deCharms | ............. | H04L 65/403 348/14.02 |
| 2015/0142879 A1* | 5/2015 | Rameil-Green | .... | H04L 65/1036 709/203 |
| 2016/0028790 A1* | 1/2016 | Eriksson | ............... | H04L 65/608 709/219 |

OTHER PUBLICATIONS

English translation of the Written Opinion dated Mar. 17, 2015 for corresponding International Application No. PCT/FR2014/053395, filed Dec. 17, 2014.
International Search Report dated Mar. 17, 2015 for corresponding International Application No. PCT/FR2014/053395, filed Dec. 17, 2014.
Anonymous, "2013—The Year of WebRTC", Jan. 9, 2013 (Jan. 9, 2013), http://blog.tmcnet.com/blog/tom-keating/webrtc/2013—the-year-of-webrtc.asp, XP055131183.
Written Opinion dated Mar. 17, 2015 for corresponding International Application No. PCT/FR2014/053395, filed Dec. 17, 2014.
WebRTC 1.0: Real-time Communication Between Browsers—W3C Editor's Draft Mar. 22, 2013, http://dev.w3.org/2011/webrtc/editor/webrtc.html#rtcpeerconnection-interface.
Overview: Real Time Protocols for Browser-based Applications—draft-ietf-rtcweb-overview-06—Feb. 20, 2013, http://datatracker.ietf.org/doc/draft-ietf-rtcweb-overview.

* cited by examiner

METHOD AND SYSTEM FOR COMMUNICATION BETWEEN WEB BROWSERS, USING A UNIFIED COMMUNICATION ENVIRONMENT

CROSS-REFERENCE TO RELATED APPLICATIONS

This Application is a Section 371 National Stage Application of International Application No. PCT/FR2014/053395, filed Dec. 17, 2014, the content of which is incorporated herein by reference in its entirety, and published as WO 2015/097367 on Jul. 2, 2015, not in English.

TECHNICAL FIELD

The invention relates to the general field of telecommunications, and relates in particular to unified communication environments enabling users to access via their terminal connected to a communication network a set of communication services via a single user interface.

More precisely, the invention relates to a method and a system for communication according to a WebRTC type technology on a communication network.

PRIOR ART

There are currently on the communication market "unified communication" solutions, i.e. solutions aimed at offering a set of services mainly intended for corporate professionals for closely integrating ("unifying"):

real-time interpersonal communication means, such as fixed and mobile telephony, videotelephony, audio/video conference bridges, etc.;

collaborative work tools (such as instant messaging, presence, web-based conferencing, document sharing and management systems, etc.);

a computer environment, with office automation tools, such as an email client, a diary, an office automation software suite.

In this type of solution, the management of the access rights of users authorized to access the communication service is generally based on the management of predefined profiles, by an administrator. Thus, each user of the service has access to the functionalities defined by their relevant profile, and they may only obtain access to additional functionalities if the administrator assigns them another predefined profile. Furthermore, since each profile corresponds to a set of functionalities, a user will not be able to obtain access to just one additional functionality.

The aforementioned type of communication solution is well suited to the corporate market where the management of collaborator access is generally centralized with an Information Systems Management (ISM). However, in an applications context, e.g. those intended for the general public, where it is the end users that generally pay for access to their communication services, the management by user profiles described above lacks flexibility, indeed the users are billed for a set of services even if they only use a portion of them. Furthermore, users do not generally have the possibility of choosing the communication functionalities that they wish to use, according to a context related to their geographical location (home or place of work), the equipment or types of terminals that they have, or according to the bit rate that they have available via their equipment for connecting to the network.

Furthermore, with the development of HTML5 (HyperText Markup Language 5), new prospects are opening up for developers of applications with the possibility of creating the interfaces (API—Application Programming Interface) with web applications, accessible in a standardized way within a web browser. This is the path followed by the IETF (Internet Engineering Task Force) and the W3C (World Wide Web Consortium) with the RTCWEB/WebRTC (Web Real-Time Communication) standard defined by two types of specifications: a protocol specification (created at the IETF) and a JavaScript API specification (created at the W3C). The aforementioned two specifications are aimed at providing an environment in which a JavaScript application incorporated in any web page, read by any compatible browser, and authorized appropriately by its user, is capable of establishing a communication using audio, video (and auxiliary data), without the browser platform restricting the types of application in which this communication functionality may be used. Currently, web browser publishers offer versions compatible with this new inter-browser service, e.g. Google with the Chrome™ browser, Mozilla with the Firefox™ browser, Opera Software with the Opera™ browser, for computer and mobile terminal, Ericsson with the Bowser™ browser developed for mobile terminal.

Typically, in accordance with the RTCWEB/WebRTC specifications (for simplicity referred to as the "WebRTC standard" in the present description), when a first user wishes to establish an audio or video communication, from their WebRTC compatible web browser, with a second user on the Internet network, they begin by connecting via their browser to an application server providing the WebRTC communication service. After an optional authentication operation, the browser loads the web application (set of JavaScript functions or similar), via a web page, in accordance with the RTCWEB specifications and suitable for interacting with the aforementioned APIs (compliant with the WebRTC specifications) that are natively incorporated in the browser. Then, the first user chooses, via the web page connecting to the application server, an identifier for the second user, then enters a command—e.g. by clicking on an action button displayed on the web page open in the browser—for initiating the audio or video call to the second user.

SUMMARY

The present invention is notably aimed at improving the situation explained earlier relating notably to the lack of flexibility of the current unified communication solutions, by taking advantage of the possibilities offered by the WebRTC standard.

For this purpose, according to a first aspect, the invention relates to a method of communication according to a WebRTC type technology on a communication network. In accordance with the invention this method includes steps of:

sending a service activation request message, by a web application loaded in a web browser on a first terminal of a first user, to an application server, in order to determine communication services currently authorized for the first user;

reception by the browser of a service activation response message, the response message containing data for access to a set of communication services, and activation by the web application in the first terminal, of each service of the set of services;

updating a communication environment graphical interface, displayed in the first terminal by the web application, with the set of communication services.

According to a particular feature of the invention, the aforementioned method of communication includes the prior connection of the first terminal to an environment server, providing a unified communication environment, and the loading of the web application incorporated in a web page provided by the environment server into the web browser on the first terminal.

The fact of combining, according to the invention, as part of a unified communication environment, a WebRTC type technology with the implementation of two servers, one for providing the communication environment graphical interface, and the other for providing the communication services themselves, notably with such an automatic mechanism for "refreshing" (updating) the services authorized for a given user, after the connection of the user's browser to the environment server, makes it possible to create the technical conditions favorable to the creation of a communication services platform that is more flexible than the known solutions to date. In other words, the invention provides a communication services platform to or from which users may subscribe or unsubscribe when they wish, and for the services that they choose, unlike the management of services by user profiles mentioned earlier.

Thus, according to a characteristic feature of the invention, the method of communication includes an operation of providing users of the communication environment, with a communication services platform in the form of independent applications, by the application server, this operation including:

automatic activation or deactivation of a given communication service for a user considered, according to the subscribed or unsubscribed status to the service by the user, and/or according to a contextual status of the user related to the user's terminal type and/or the network connection rate of the terminal, and/or according to geolocation information regarding the terminal;

activation or deactivation, at the request of the user, in response to an activation or deactivation request message transmitted by a user's terminal;

generating and sending to a user terminal, a service activation or deactivation response message, in response to a service activation or deactivation request message.

Thanks to such an application platform provided by the application server, the activation or deactivation of a communication service may be performed at the request of the user or according to conditions related to a contextual situation of the user. For example, according to whether users are located at their place of work or at their home, some applications may be authorized and others not (for reasons of confidentiality of access, for example), or, according to another example, applications may be temporarily inhibited if they are not compatible with the capabilities of a terminal type used, or if the type of access network and the network connection rate of the user's terminal are not compatible with certain applications (e.g. videoconferencing). The user's contextual information capable of initiating the activation or deactivation of certain communication applications is provided generally by the terminal (notably by means of dedicated sensors, such as a geolocation application) to the web application loaded by the browser on the terminal, and then transferred in the service activation messages transmitted by the browser to the application server.

According to one embodiment of the invention, the method of communication includes the selection via the aforementioned graphical interface, of an identifier of a second user and of a communication service from the set of services authorized for the first user and the sending by the browser on the first terminal of a communication request message according to the selected service, to a second terminal associated with the identifier of the second user.

This arrangement, in order to make a communication request, enables the user to easily associate an identifier of a contact (e.g. an email address or a phone number) with a communication application (audio call or instant messaging, for example).

In addition, according to one feature of the invention, the method includes, following the reception by the second terminal connected to the environment server, of the communication request message to the service selected by the first user, steps of:

determining the activity status for the second user of the service selected by the first user, and if the selected service is not active, automatic proposal to the second user via a user interface means on the second terminal to subscribe to the service selected by the first user;

on a positive response from the second user entered via a user interface means on the second terminal, sending a request message for activation of the selected service, by the web application of the browser on the second terminal, to the application server;

reception by the second browser of a response message for activation of the service selected by the first user, and activation by the web application in the second terminal of the selected service.

Thanks to this feature, a first user may attempt to communicate with a second user who is registered in the environment, with a communication mode chosen by the first user, even if the second user has not subscribed to the communication mode chosen. The environment then automatically proposes to the second user to subscribe to this communication mode, and the connection of the two users may then be automatically initiated as soon as the subscription is effective.

According to one embodiment of the invention, each communication service corresponds to a code block initially present in the source code of the web application loaded by a browser on a user terminal. The code block of a given service is then activated following the reception by the browser, of a service activation response message, when the user subscribes to the service, or when the terminal connects to the environment server, the user having already subscribed to the service.

This embodiment notably offers the advantage of minimizing the volume of data exchanged between the application server and the user terminal for activating the service considered.

According to an alternative embodiment to the preceding one, each communication service corresponds to a code block not initially present in the source code of the web application loaded by a browser on a user terminal. In this case, the activation of a service corresponding to a code block is performed by the transmission of the corresponding source code block, via a service activation message, received in the terminal following the subscription to the service by the user, or when the terminal connects to the environment server, the user having already subscribed to the service.

This embodiment notably offers the advantage of minimizing the size of the web application downloaded by a user terminal, since only the code of the services active for the user is contained in the web application.

In practice, the service activation request, service activation response, communication request according to a selected service and, selected service activation request messages, are messages using the HTTP protocol or a similar protocol compatible with a WebRTC type technology. In addition, the web application loaded by the browser on a user terminal by connecting to the environment server, is an application using the JavaScript language or a similar language compatible with a WebRTC type technology.

It is recalled here that "WebRTC type" technology is understood to mean a real-time communication technology implemented from a web browser based on the same principles as those defined by the current RTCWEB/WebRTC specifications or by future developments of these specifications, i.e. based on WebRTC compatible web browsers, i.e. without it being necessary to add any additional software modules such as extension modules (plugins) to these browsers. Secondly, an "Internet type" network, is understood to mean a network based on communication technologies implemented in the Internet network, such a network also being capable of being a private corporate network commonly termed an "intranet".

Correspondingly, according to a second aspect, the invention relates to a unified communication system using a WebRTC type technology on a communication network. According to the invention, this communication system is characterized in that it includes an application server, hosting a download platform for communication applications accessible via a web browser on a user terminal, this platform including:

means of access to a set of communication applications each offering a separate communication service that may be subscribed to by a user independently of other services;

means of processing service activation or deactivation request messages, originating from user terminals, the means of processing being configured for activating or deactivating a communication service for a user considered, according to at least one condition related to a contextual situation of the user;

means of generating and sending to a user terminal, a service activation or deactivation response message, in response to a service activation or deactivation request message.

According to one particular feature of the invention, the aforementioned system further includes a server environment, providing a unified communication environment, via a web application made available for downloading from web browsers with which user terminals are provided.

According to a particular implementation of the system according to the invention, a condition related to a contextual situation of a user includes at least one element from: the subscribed or unsubscribed status to a service for the user, a user's terminal type, a network connection rate of the user's terminal, geolocation information regarding the user's terminal.

According to a third aspect, the subject matter of the invention is a web application providing WebRTC type communication functionalities between web browsers, and including program instructions the execution of which by a web browser on a terminal of a user causes the implementation of steps of:

sending a web service activation request message from the browser to an application server, in order to determine the communication services that are currently authorized for the user;

reception by the browser of a service activation response message, the response message containing data for access to a set of communication services, and activation in the terminal, of the services of the set of services;

display of a communication environment graphical interface and updating of this graphical interface by the browser with the set of communication services;

following the selection by the user via the graphical interface, of an identifier of a second user and of a communication service from the set of services, sending by the browser of a communication request message according to the selected service, to a terminal of the second user.

According to a fourth aspect, the invention relates to a communication server accessible by a web browser, intended to provide a unified communication environment according to a WebRTC type technology between web browsers, this communication server being characterized in that it includes a web server hosting at least one web page including a web application according to the invention, as defined above.

According to a fifth aspect, the invention relates to an application server as implemented in a communication system according to the invention, as defined earlier.

In practice, the constituent means of the invention which are included in the environment and application servers succinctly described above, are essentially implemented in software form i.e. one or more computer programs stored in one or more memories, of the RAM (Random Access Memory), ROM (Read Only Memory) or magnetic type (hard disk, for example), and executed by a processor incorporated in the server considered.

Consequently, according to a last aspect, the present invention is also aimed at a computer program stored on an information medium for the implementation of all or part of the steps of a method of communication, according to the invention, when the program is executed by a processor in a computer system.

Such a computer program according to the invention may use various programming languages, and include programs in the form of source code, object code, or intermediate code between source code and object code, such as in a partially compiled form, or in any other desirable form.

Finally, the invention is also aimed at a medium for recording information readable by a computer, and comprising computer program instructions. Such a recording medium may also consist of any entity or device capable of storing such a program. For example, the medium may comprise a storage means, such as a ROM, e.g. a CD-ROM or a microelectronic circuit ROM, or a removable recording means, such as a USB stick or a magnetic recording means, such as a hard disk. On the other hand, a software module according to the invention may in particular be downloaded from an Internet type network.

The advantages provided by a communication system, an environment server and an application server, a web application and a computer program, according to the invention, as briefly defined above, are identical or contribute to those mentioned above in relation to the method of communication according to the invention, and accordingly will not be recalled here.

BRIEF DESCRIPTION OF THE FIGURES

Other features and advantages of the present invention will emerge from the following detailed description, which makes reference to the accompanying drawings in which.

DETAILED DESCRIPTION OF THE INVENTION

Figure 1:
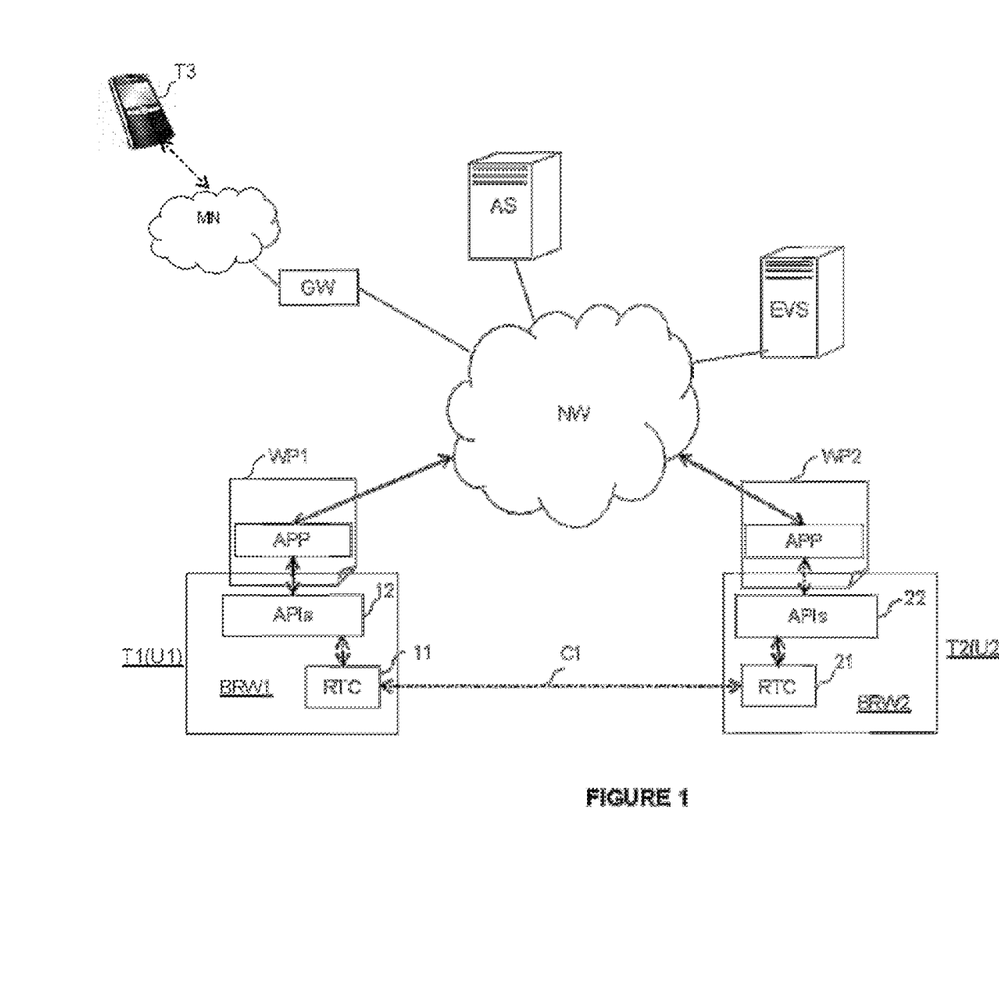
FIG. 1 illustrates a unified communication system in conformity with the invention.

FIG. 1 illustrates a unified communication system in conformity with the invention. This communication system as represented in this example, includes a first web browser BRW1 of a first user (user U1) terminal T1, a second browser BRW2 of a second user (user U2) terminal T2. The aforementioned user terminals may be in a connected or non-connected state to a communication network NW which is an Internet type network, i.e. a network based on the communication technologies implemented in the Internet network, in particular the network NW may be also a corporate network termed an intranet.

The browsers BRW1 and BRW2 are WebRTC/RTCWEB compatible browsers, and accordingly, respectively possess a set 12, 22 of API interfaces in conformity with the WebRTC specifications, and a functional module RTC 11, 21 in conformity with the RTCWEB specifications. Further information concerning the RTCWEB/WebRTC specifications may be obtained by consulting the following documents:

WebRTC 1.0: Real-time Communication Between Browsers—W3C Editor's Draft Mar. 22, 2013—accessible on the Internet at the following address:

http://dev.w3.org/2011/webrtc/editor/
webrtc.html#rtcpeerconnection-interface

Overview: Real Time Protocols for Browser-based Applications—draft-ietf-rtcweb-overview-06—Feb. 20, 2013— accessible on the Internet at the following address:

http://datatrackerietf.org/doc/draft-ietf-rtcweb-overview.

The API sets 12 and 22 are capable respectively of interacting with a web application APP—the code of which uses languages such as HTML, JavaScript and CSS (Cascading Style Sheets)—incorporated in web pages WP1 and WP2 downloaded respectively by the browsers BRW1 and BRW2 at a web address pointing to resources hosted by a server EVS on the network NW.

Figure 3:
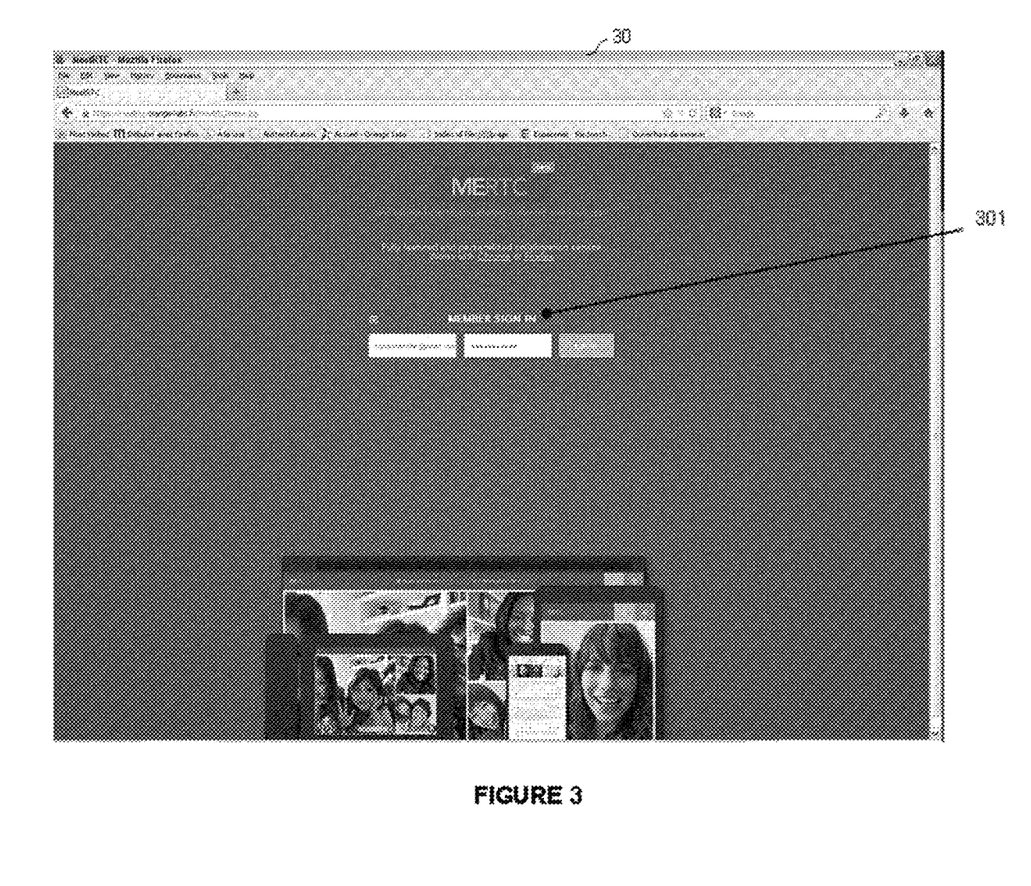
FIG. 3 represents an example of a home web page of a communication service according to the invention, after connection of a web browser to a communication environment server according to the invention.

The server EVS designated here as the "environment server" more precisely provides a home page of a unified communication environment at the aforementioned web address. FIG. 3 described later describes an example of a home web page of a communication service according to the invention, after connection of a web browser to a communication environment server according to the invention.

The application APP provides in accordance with the WebRTC/RTCWEB specifications, RTC communication functionalities related to the communication environment provided by the server EVS, and the signaling for establishing such a communication between browsers.

Thus, in the example illustrated in FIG. 1, if the two browsers BRW1 and BRW2 have each downloaded the web page (WP1 and WP2) containing the application APP of the unified communication service according to the invention, then they may establish a peer-to-peer real-time communication, notably of the voice or video type, as illustrated by the double arrow C1.

On the other hand, if the browser BRW1 attempts to establish a call with the terminal in which the browser BRW2 is installed and the latter is closed or is not connected to the server AS and has not opened the web page WP2 of the service, or if the corresponding terminal is not connected to the network or if the user (U2) of the terminal T2 simply does not respond to the call, then the communication C1 cannot be established between the two browsers BRW1 and BRW2. In this case, if the user U2 has subscribed to a voice messaging application with the application server AS (see FIG. 4, Voicewebrtc application), then the calling user (U1) will have the possibility of leaving a voice or video message for the user U2.

Still in FIG. 1, the communication system according to the invention also includes a second server AS, designated here as the "application server", hosting a download platform for communication applications accessible via a web browser on a user terminal. In terms of functional modules, the platform of the server AS includes:

1) A module for access to a set of communication applications each offering a separate communication service that may be subscribed to by a user independently of other services. Each of the communication applications provided by the platform of the server AS may be either an application whereof the code is directly provided by the server AS, or an application whereof the signaling is provided by an external server such as a "Node.js" server while the media stream is directly exchanged between the browsers of the user terminals according to a peer-to-peer mode.

2) A module for processing service activation request messages, originating from user terminals, such as terminals T1 and T2, having previously downloaded the web application; this processing module is, according to the invention, configured for activating or deactivating a communication service for a user considered, according to a plurality of events, notably the subscribed or unsubscribed status to the service by the user, the contextual status of the user related to the user's terminal type (in particular its functional capabilities), the network connection rate available to the terminal, or geolocation information regarding the terminal, e.g. for determining whether the user is located in a professional or private context.

3) A module for generating and sending to a user terminal, a service activation or deactivation response message in response to a service activation or deactivation request message.

Finally, FIG. 1 represents a mobile terminal T3 associated, for example, with a third user (U3) connected to a second, third or fourth generation (2G, 3G, 4G) mobile telephony network MN itself connected to a gateway GW for connecting the mobile network MN to the network NW.

Thus, if the mobile terminal T3 is provided with a WebRTC compatible web browser, then it may also access the communication environment provided by the server EVS by downloading the home web page containing the web application APP.

Furthermore, in the chosen and disclosed embodiment, servers AS and EVS are considered which are hosted by separate and optionally remote network equipment on the network NW, however, according to other embodiments the servers AS and EVS may be implemented in the same network equipment, e.g. in the form of separate virtual machines hosted by the same physical server. Finally, according to another possible implementation of the invention, the functionalities implemented by the aforementioned two servers may be provided by one and the same server.

Figure 2:
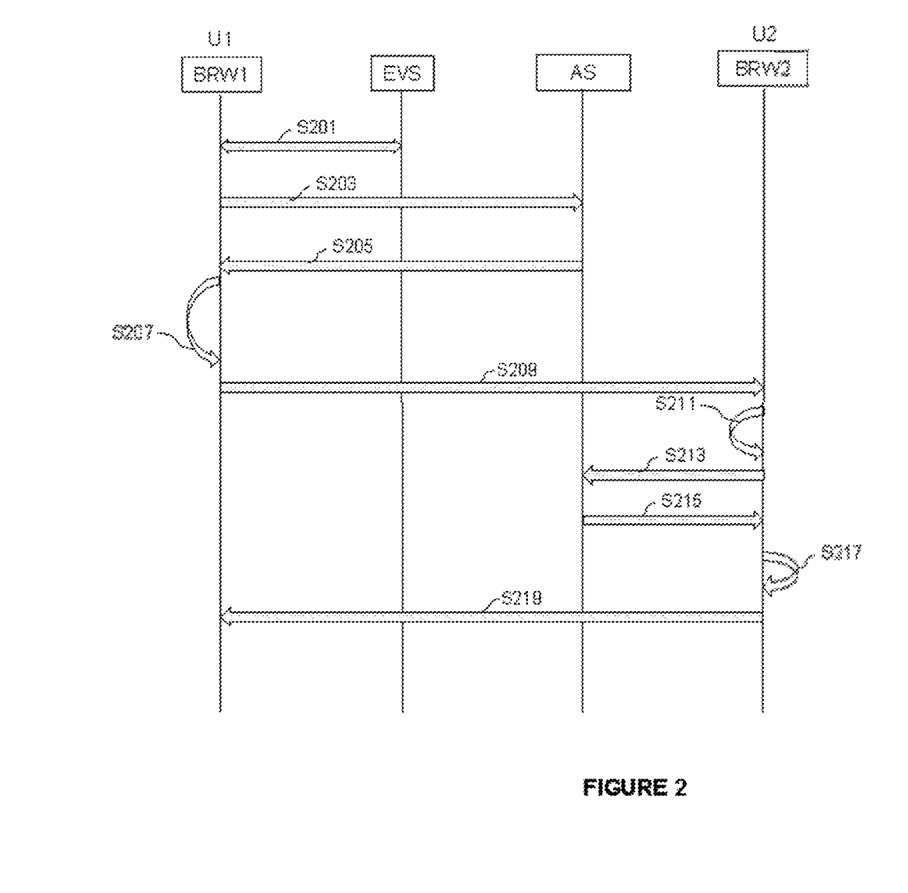
FIG. 2 is a diagram representing the exchanges between the various entities represented in FIG. 1 according to one example of implementation of a method of communication according to the invention.

In connection with FIG. 2, the main steps will now be described of a method of communication according to one embodiment of the invention. FIG. 2 is a diagram representing the exchanges between the various entities represented in FIG. 1.

As represented in FIG. 2, in step S201, the user U1 is connected via his/her browser BRW1 to the communication environment server EVS by loading the home web page of the environment, the latter including a web application APP according to the invention.

FIG. 3 represents an example of a home web page (30) of a communication service according to the invention, displayed on the screen of the terminal T1 after connection of the browser BRW1 to the server EVS. In this example, after loading the web page 30, the user begins by authenticating himself/herself to the communication environment by entering (LOGIN button, 301) personal identifiers such as an email address and a password (MEMBER SIGN IN, 301). If the identifiers entered are correct, the browser BRW1 then loads the web page of the communication environment itself, and displays a graphical interface associated with the communication environment.

In FIG. 2, after loading the web page of the communication environment, the web application incorporated in the web page automatically sends (S203) a service activation request message to the application server AS in order to determine the communication services which are currently authorized for the user U1. A user account management application, in the server AS, receives the request message for activating services for the user U1 and sends (S205) to the browser BRW1 a service activation response message, this response message containing data for access to a set of communication services to which the user U1 has subscribed. Following this response, the web application executed by the browser BRW1, in the terminal (T1) of the user U1, activates the set of services and updates (S207) the communication environment graphical interface, displayed in the terminal T1.

According to the chosen and described embodiment, each communication service corresponds to a code block initially present in the source code of the web application APP loaded by a browser on a user terminal, this code block being activated following the reception by the browser of a service activation response message when the user subscribes to the service or when the terminal connects to the environment server, the user having already subscribed to the service. In practice, in this embodiment, all the JavaScript files associated with the web page are downloaded onto the browser when the user terminal is connected. Each of these files contains functions which correspond to services, and these functions are activated—i.e. the corresponding services may be used—only when the user has subscribed to these services. For example, in this embodiment, JavaScript functions corresponding to a service may be in an active or inactive state according to whether a Boolean variable of the corresponding JavaScript code is set to true or false, the updating of this variable being performed when a service activation response message transmitted by the application server AS is received.

According to a variant embodiment the code blocks corresponding to the various communication services are not initially present in the HTML code of the web application loaded by a browser on a user terminal. The activation of a service corresponding to a code block being performed by transmitting the corresponding code block, via a service activation message transmitted by the application server AS to the user terminal, following the subscription to the service by the user, or following the connection of the terminal to the environment server, the user having already subscribed to the service. In practice, in this variant embodiment, the message for activating a given service modifies the HTML code of the web page by dynamically adding <script> tags enabling the JavaScript code corresponding to the service considered to be called up dynamically by the web page. These tags are consequently added or removed in the HTML code of the web page loaded (WP1, WP2—FIG. 1) in the browser, according to the subscribed or unsubscribed status of the user to the service considered. Thus, according to both of the aforementioned variant embodiments, the data for access to services, mentioned earlier, contained in a response message issued by the application server AS are program code elements for either assigning a value (true or false) to a Boolean variable for activating a service functionality, or adding a code block that corresponds to a service functionality.

Figure 4:
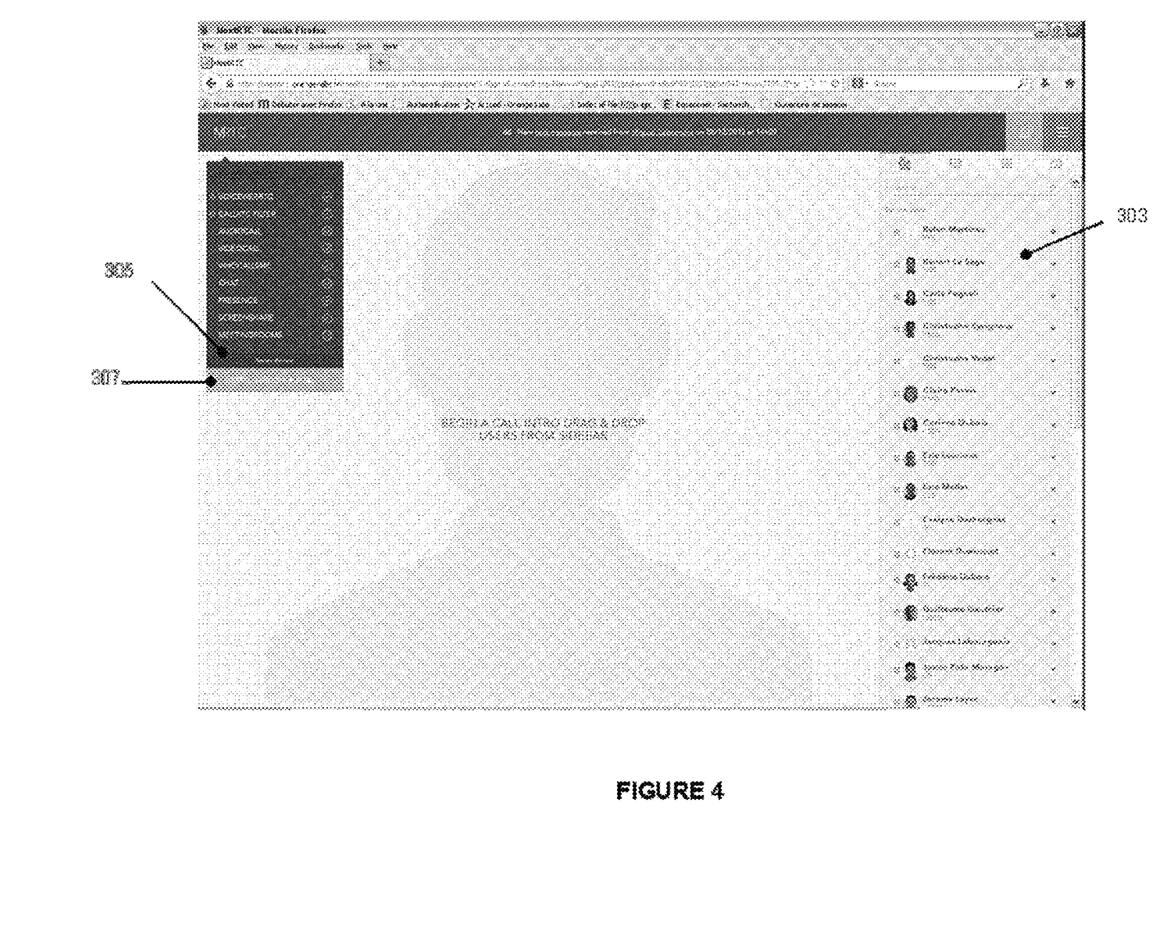
FIG. 4 represents an example of a communication environment graphical interface, according to the invention, displayed by a web browser after authentication of a user via the web page in FIG. 3.

FIG. 4 represents an example of a communication environment graphical interface, according to the invention, displayed by a web browser after authentication of a user via the web page in FIG. 3. As represented in FIG. 4, the graphical interface of the environment comprises a portion 303 located to the right of the window and comprising a list of the user's contacts, a drop-down list 305 for viewing a list of communication services activated for the connected user. This list corresponds to the visual result of the aforementioned updating (step S207, FIG. 2) of the communication environment graphical interface, displayed in the terminal T1.

Thus, in this example the list of activated services includes as examples: voicemail (Voicewebrtc), a call filtering service (Callrtcfilter), an audio call service (Audiocall), a video call service (Videocall), a caller information service (Whocallme), an instant messaging service (Chat), a presence service (Presence), a screen sharing service (Screenshare), a video conferencing service (Meetingrooms), etc.

It is pointed out here that the communication services offered by such a communication environment according to the invention are not limited to interpersonal (real-time) audio or video modes of communication, but also encompass all other interpersonal communication services, such as instant messaging or electronic messaging (email), as well as associated (messaging, filtering, etc.) or derivative or complementary communication services, such as presence, geolocation, or gaming services. In the context of the present invention, all of these services are thus designated as "communication services" interpreted in the broad sense.

Figure 6:
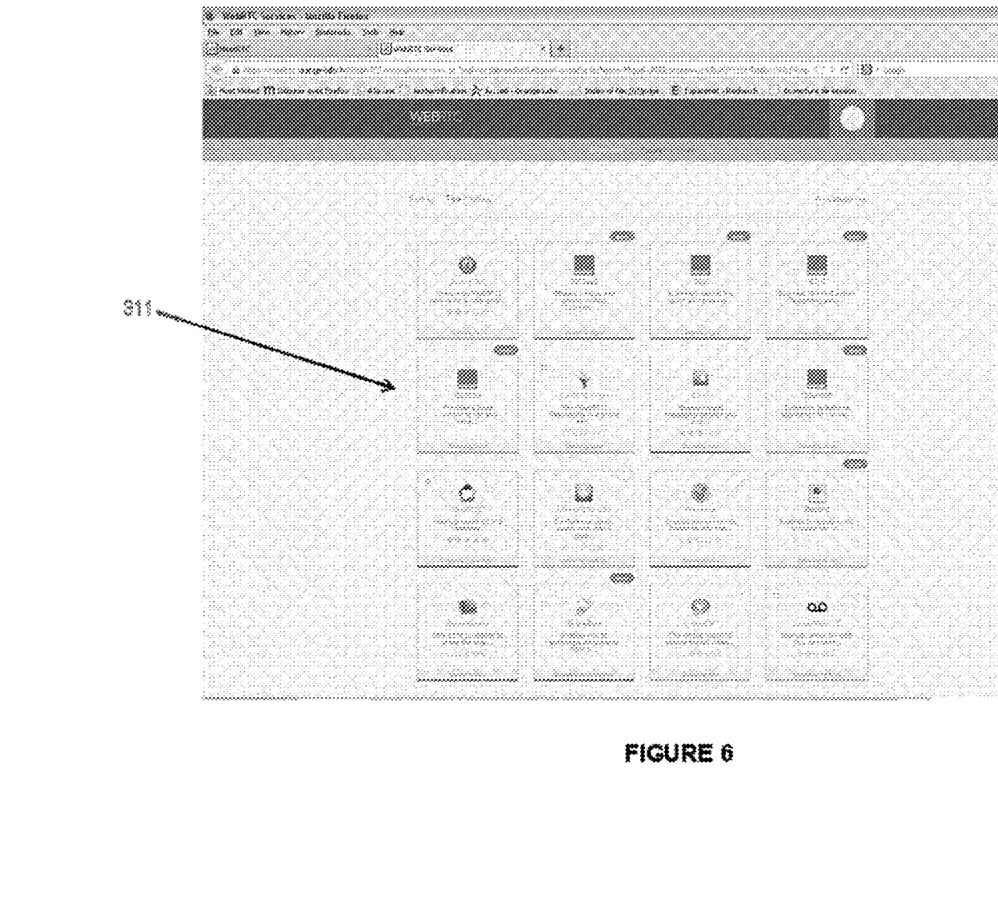
FIG. 6 represents an example of a graphical interface displayed by a web browser on a user terminal after connection of the browser to a home web page of a communication application server according to the invention.
Figure 7:
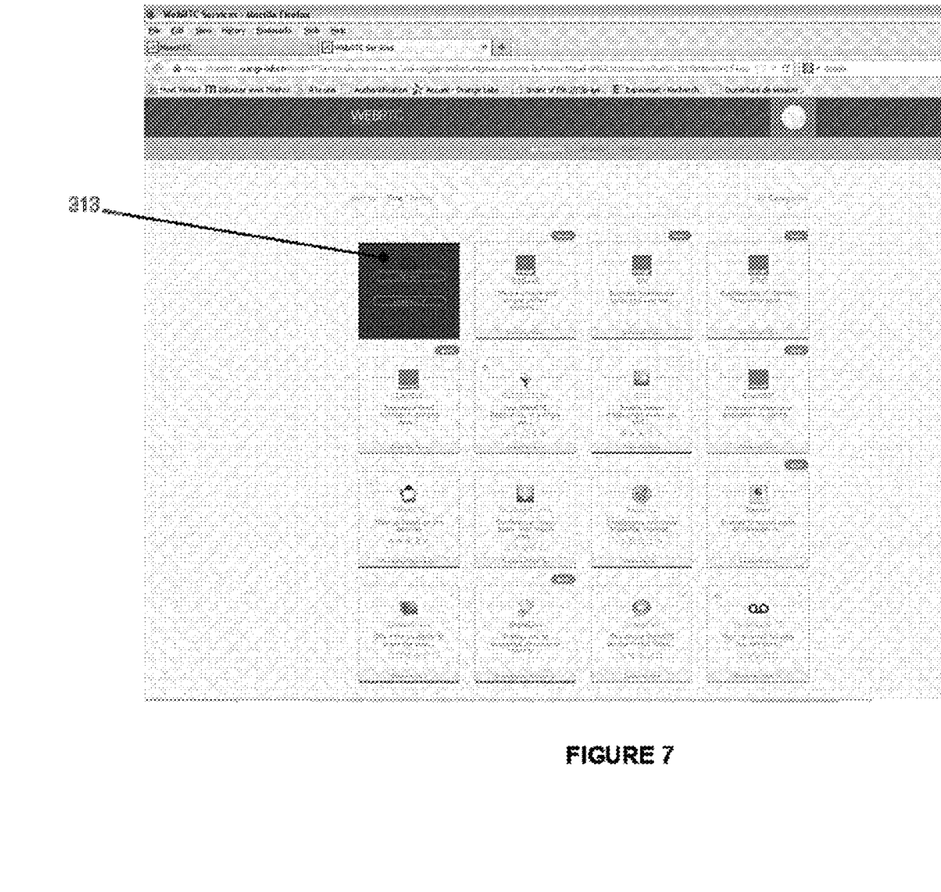
FIG. 7 represents the graphical interface in FIG. 6 after selection by the user of an icon representing a particular communication application.

Still in FIG. 4, if the user wishes to subscribe to an additional service, this may be done directly by clicking on the active field 307 (Webrtc Services Portal), which causes the activation of a URL (Uniform Resource Locator) and the loading of a home web page of the application server AS, as illustrated in FIGS. 6 and 7, described below.

Returning to FIG. 2, after the updating in the graphical interface displayed by the browser BRW1 of the active services for the user U1, the latter may then select (S207) via the graphical interface, an identifier of one of their contacts, in this example the user U2, and a communication service from the set of activated services, in order to establish a communication with the user U2.

Figure 5:
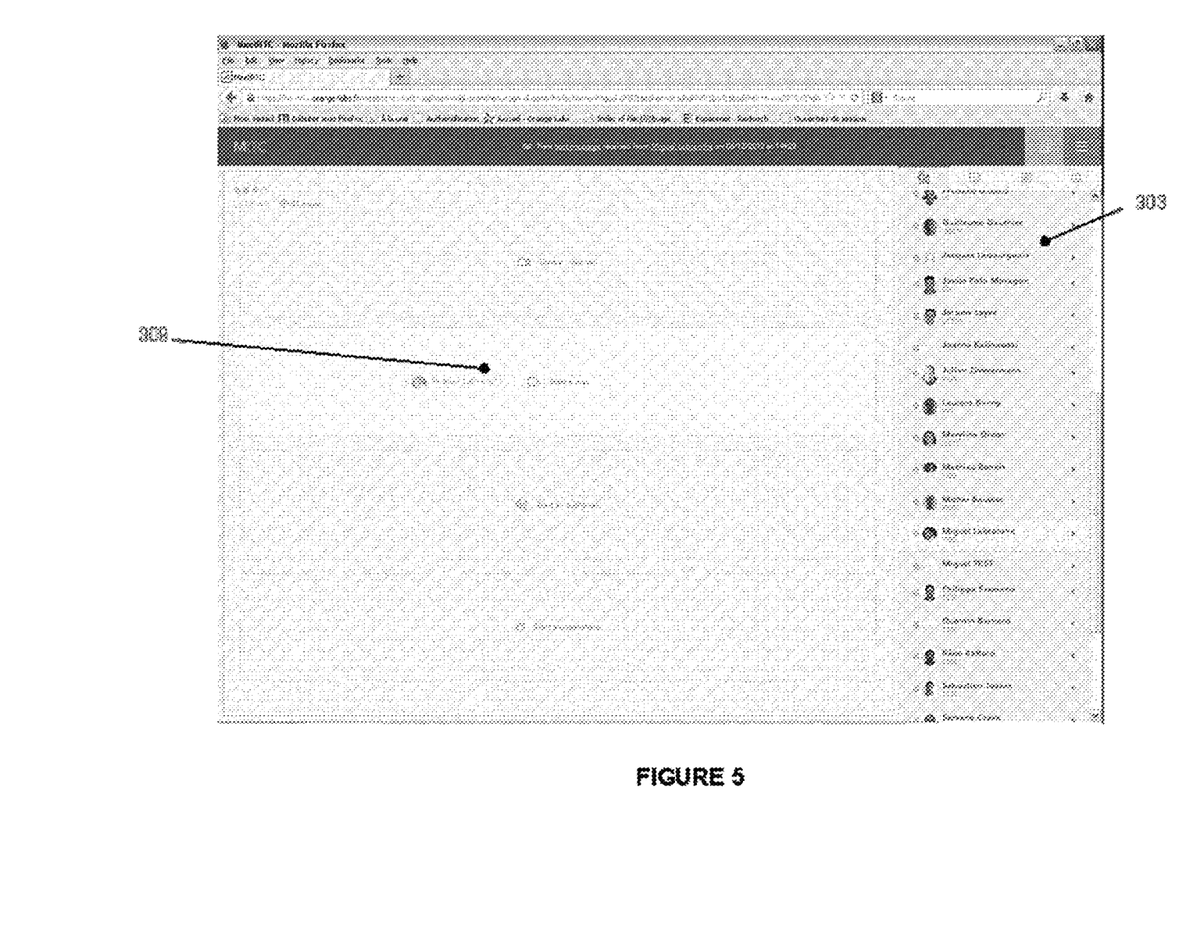
FIG. 5 represents the graphical interface in FIG. 4 after selection of a contact by the interface user and selection of a communication mode for establishing a communication with the selected contact.

FIG. 5 represents the graphical interface in FIG. 4 after selection of a contact by the interface user and selection of a communication mode for establishing a communication with the selected contact. In the embodiment illustrated in FIG. 5, the selected contact in the field 303 of the window is chosen by selecting an icon which is then dropped according to a method of drag-and-drop in the central window portion here displaying four stacked fields, each corresponding to a different communication mode. In the example illustrated here, the icon of the selected contact is dropped in the field 309 which displays the text "start a chat" which initiates the establishment of an instant messaging communication with the selected contact.

Still in FIG. 2, in step S209, the web application of the browser BRW1 sends a message requesting communication with the user U2 corresponding to the chosen service, to the terminal T2 (browser BRW2). It is assumed here that the terminal T2 of the user U2 is already connected to the environment server EVS via its browser.

In practice, in the embodiment described, the communication request message may be a message according to the JSON (JavaScript Object Notation) data format transmitted via a WebSocket channel (standardized by the IETF in RFC 6455).

In step S209, following the reception of the communication request message to the service selected by the user U1, the application APP implemented by the web page WP2 loaded in the browser BRW2 of the user U2, determines (S211) the activity status for the user U2 of the selected service for the communication request sent by the user U1. If the requested service is active for the user U2 then the communication is automatically established (step not represented in FIG. 2). On the other hand, if the selected service is not active for the user U2, then the application APP loaded by the browser BRW2 warns the user U2 by sending a notification, e.g. by displaying a pop-up window on the terminal of the user U2 indicating that the user U1 has made a communication attempt according to the selected service (e.g. instant messaging) and offering him/her to subscribe to the service considered. Such a notification may also alternatively or additionally take the form of an SMS or an email sent to a terminal of the user U2, and containing where appropriate at least one link (URL) to the environment server and/or to the application server.

On a positive response from the second user, entered (S211), for example, by clicking with a mouse on a graphical element displayed in the aforementioned pop-up window, the web application loaded in the browser BRW2 sends (S213) a request message for activation of the service considered (e.g. instant messaging) to the application server AS. The latter subscribes the user U2 to the service requested in the activation request message, and transmits (S215) a corresponding activation response message, to the browser BRW2. The code of the web application (WP2) is then updated (S217) and the communication service in question becomes active in the communication environment of the user U2, displayed by the browser BRW2.

The user U2 may then initiate in their turn a communication request according to the newly activated communication service (instant messaging, for example), which is expressed by sending (S219) a request for establishing communication to the browser BRW1 of the user U1. It should be noted that according to the chosen implementation, the connection may be automatically initiated as soon as the communication mode selected by the user U1 is activated for the user U2.

FIG. 6 represents a graphical interface displayed by a web browser on a user terminal after the browser has loaded the home page of the application server AS. It should be noted that once the home page of the server AS is loaded in the browser, this page may be stored locally in the browser, giving the user read access to the list of its applications, while offline from the application and environment servers.

As illustrated in FIG. 6, the user has the possibility of choosing applications from a set of applications respectively represented by icons 311. For example, as represented in FIG. 7, if the user clicks on the first icon (313) located at the top and to the left of the block of icons then the user has the possibility of obtaining information ('Details' button) on the corresponding functionality or of unsubscribing ('Uninstall' button) from this service.

In practice, in the embodiment described, service activation or deactivation request, service activation/deactivation response, communication request according to a selected service and selected service activation request messages, are messages using the HTTP protocol or a similar protocol compatible with a WebRTC type technology, and the web application loaded by the browser on a user terminal by connecting to the environment server EVS, is an application using the JavaScript language or a similar language compatible with a WebRTC type technology.

The present invention thus provides a unified communication service that offers great flexibility making it possible for a user to compose his/her own environment, like a jigsaw puzzle or a set of LEGO®, by choosing the applications or services that he/she actually wishes to use, according to their needs or their budget.

Although the present disclosure has been described with reference to one or more examples, workers skilled in the art will recognize that changes may be made in form and detail without departing from the scope of the disclosure and/or the appended claims.

The invention claimed is:

1. A method of communication according to a WebRTC type technology on a communication network, wherein the method includes the following acts performed by a first terminal of a first user:

connecting through the communication network to an environment server providing a unified communication environment, and loading a web application incorporated in a web page provided by said environment server, into a web browser on the first terminal;

automatically sending, through the communication network, a service activation request message, by said web application loaded in the web browser on the first terminal, to an application server, said application server being independent from the environment server and providing communication services, in order to determine which communication services among said provided communication services are currently authorized for the first user;

reception through the communication network by said web browser, from the application server, of a service activation response message, said response message containing data for access to a set of communication services among the provided communication services, and activation by the web application in the first terminal, of each service of said set by using the received data; and automatically updating a communication environment graphical interface, displayed in the first terminal by said web application, with said set of communication services.

2. The method as claimed in claim 1, including an operation of providing users of the communication environment, with a communication services platform in the form of independent applications, by the application server, said operation including:

automatic activation or deactivation of a given communication service for a user considered, according to at least one of: a subscribed or unsubscribed status to said service by the user; a contextual status of the user related to the user's terminal type; a network connection rate of the terminal; or geolocation information regarding the terminal;

activation or deactivation, at the request of the user, in response to an activation or deactivation request message transmitted by a user's terminal;

generating and sending to a user terminal, a service activation or deactivation response message, in response to a service activation or deactivation request message.

3. The method as claimed in claim 1, including selecting via said graphical interface, an identifier of a second user and of a communication service from the set of services authorized for the first user and sending by the web browser on the first terminal of a communication request message according to the selected service, to a second terminal associated with the identifier of the second user.

4. The method as claimed in claim 3, including, following reception by the second terminal connected to said environment server, of said communication request message to the service selected by the first user:

determining an activity status for the second user of the service selected by the first user, and if the selected service is not active, automatic proposal to the second user via a user interface means on the second terminal to subscribe to the service selected by the first user;

on a positive response from the second user entered via a user interface on the second terminal, sending a request message for activation of said selected service, by a web application loaded in a web browser on the second terminal, to the application server;

reception by the web browser on the second terminal of a response message for activation of the service selected by the first user, and activation by the web application in the second terminal of the selected service.

5. The method as claimed in claim 1, in which each communication service corresponds to a code block initially present in source code of said web application loaded by a web browser on a user terminal, this code block being activated following reception by the web browser of a service activation response message when the user subscribes to the service or when the terminal connects to the environment server, the user having already subscribed to the service.

6. The method as claimed in claim 1, in which each communication service corresponds to a code block not initially present in source code of said web application loaded by a web browser on a user terminal, the activation of a service corresponding to a code block being performed by transmission of the corresponding source code block, via a service activation message, received in the terminal following subscription to the service by the user, or when the terminal connects to the environment server, the user having already subscribed to the service.

7. The method as claimed in claim 4, in which said
service activation request message,
service activation response message,
communication request message according to a selected service,
selected service activation request message,
are messages using the HTTP protocol or a similar protocol compatible with a WebRTC type technology, and said web application loaded by a web browser on a user terminal by connecting to said environment server, is an application using the JavaScript language or a similar language compatible with a WebRTC type technology.

8. The method as claimed in claim 1, the method further comprising:

selecting via said communication environment graphical interface, an identifier of a second user and of a communication service from the set of services authorized for the first user, and in which, if the service selected by the first user is not active for the second user, the method further includes sending, by a web application loaded in a web browser of the second terminal, a notification to the second terminal, said notification indicating that the first user has made a communication attempt according to the service selected by the first user.

9. The method as claimed in claim 8, in which the notification is an SMS or an email, the notification further containing at least one Uniform Resource Locator link to the environment server.

10. The method as claimed in claim 8, in which the notification is an SMS or an email, the notification further containing at least one Uniform Resource Locator link to the application server.

11. The method as claimed in claim 8, in which the notification is an SMS or an email, the notification further containing at least one Uniform Resource Locator link to the application server and to the environment server.

12. A communication system using a WebRTC type technology on a communication network, wherein said communication system comprises:

an environment server providing a unified communication environment, via a web application made available for downloading from web browsers with which user terminals are provided;

an application server, said application server being independent from the environment server and providing communication services, hosting a download platform for communication applications accessible via a web browser on a user terminal, said platform including:

means for access to a set of communication applications, each offering a separate communication service that may be subscribed to by a user independently of other services;

means for processing service activation or deactivation request messages, originating from user terminals, said means for processing being configured for activating or deactivating a communication service for a user considered, according to at least one condition related to a contextual situation of the user;

means for generating and sending to a user terminal, a service activation or deactivation response message, in response to a service activation or deactivation request message.

13. The system as claimed in claim 12, in which a condition related to a contextual situation of a user includes at least one element from: a subscribed or unsubscribed status to a service for the user, a user's terminal type, a network connection rate of the user's terminal, geolocation information regarding the user's terminal.

14. A communication environment server accessible by a web browser, to provide a unified communication environment according to a WebRTC type technology between web browsers, wherein said communication environment server comprises:
- a web server comprising a processor and a non-transitory computer-readable memory, and hosting at least one web page including a web application stored on said non-transitory computer-readable memory and providing WebRTC type communication functionalities between web browsers, the web application comprising program instructions, execution of which by a web browser on a terminal of a user causes the implementation of acts including:
- automatically sending through a communication network a web service activation request message, from the web browser to an application server providing communication services, in order to determine which communication services among said provided communication services are currently authorized for the user;
- reception, through the communication network from the application server, by the web browser, of a service activation response message, the response message containing data for access to a set of communication services among the provided communication services, and activation in the terminal, of each service of the set of services by using the received data;
- display of a communication environment graphical interface and updating of this graphical interface by the web browser with said set of communication services;
- following the selection by the user via said graphical interface, of an identifier of a second user and of a communication service from the set of services, sending by the web browser of a communication request message according to the selected service, to a terminal of the second user.

15. A non-transitory computer-readable medium comprising a computer program stored thereon for implementing a method of communication according to a WebRTC type technology on a communication network, when the program is executed by a processor in a first terminal of a first user, wherein the program configures the first terminal to perform acts of:
- connecting through the communication network to an environment server providing a unified communication environment, and loading a web application incorporated in a web page provided by said environment server, into a web browser on the first terminal;
- automatically sending through the communication network a service activation request message, by the web application loaded in the web browser on the first terminal of the first user, to an application server, said application server being independent from the environment server and providing communication services, in order to determine which communication services are currently authorized for the first user;
- reception through the communication network from the application server, by said web browser, of a service activation response message, said response message containing data for access to a set of communication services among the provided communication services, and activation by the web application in the first terminal, of each service of said set by using the received data; and
- automatically updating a communication environment graphical interface, displayed in the first terminal by said web application, with said set of communication services.

* * * * *